United States Patent [19]

Georgalas et al.

[11] 4,341,678

[45] Jul. 27, 1982

[54] WATER-BORNE EPOXY-PHENOLIC COATING COMPOSITIONS

[75] Inventors: Nick Georgalas, Brooklyn, N.Y.; William P. Keaveney, Pompton Plains, N.J.

[73] Assignee: Inmont Corporation, Clifton, N.J.

[21] Appl. No.: 223,861

[22] Filed: Jan. 9, 1981

Related U.S. Application Data

[63] Continuation of Ser. No. 75,765, Sep. 17, 1979, abandoned.

[51] Int. Cl.$^3$ .............................................. C08L 63/02
[52] U.S. Cl. ................................ 523/414; 220/1 BC; 428/418; 525/523; 523/100
[58] Field of Search .................. 260/29.3, 29.2 EP; 528/121; 525/481, 486, 523; 428/418

[56] References Cited

U.S. PATENT DOCUMENTS

| | | | |
|---|---|---|---|
| 2,033,092 | 3/1936 | Bruson | 528/163 |
| 2,521,911 | 9/1950 | Greenlee | 525/486 |
| 2,606,929 | 8/1952 | Martin | 528/154 |
| 4,094,844 | 6/1978 | Allen et al. | 260/29.3 |
| 4,102,862 | 7/1978 | Monte et al. | 528/88 |
| 4,247,659 | 1/1981 | Sekmakas et al. | 525/43 |

*Primary Examiner*—Theodore E. Pertilla
*Attorney, Agent, or Firm*—Michael R. Chipaloski

[57] ABSTRACT

Water-borne epoxy-phenolic container coating compositions comprising a blend of
(1) a water-miscible amine solubilized epoxy resin and
(2) a water soluble monomeric phenolic compound.

The coatings are especially useful, when cured, as container coatings and exhibit superior resistance to high acid and high protein foods.

6 Claims, No Drawings

WATER-BORNE EPOXY-PHENOLIC COATING COMPOSITIONS

This is a continuation of application Ser. No. 075,765, filed Sept. 17, 1979, now abandoned.

BACKGROUND OF THE INVENTION

Current coatings used for the interior of food can containers are generally solvent-borne and are in part based on epoxy-phenolic resin combinations. Such coatings contain up to 70% of organic solvent and thus are not in compliance with current EPA regulations. Solvent recovery or incineration after coating cure represent a costly response to EPA regulations because of needed investment in new equipment and consumption of additional energy, in the incineration.

Water-borne container coating compositions such as those in which the volatile component contains greater than 75% water as solvent are very much in demand, especially for food container coating applications. In recent years, emphasis in the water-borne coating area has been directed toward resins of the polyester, acrylic and epoxy classes which can be cured with water-soluble aminoplast cross-linking compounds. We have now found that a water-borne coating composition exhibiting superior high acid and high protein resistance can be made utilizing an epoxy-phenolic resin binder system. The epoxy-phenolic resin binder system provides the combination of process and chemical resistance unmatched by the prior art coatings.

SUMMARY OF THE INVENTION

The present invention provides an improved water-borne epoxy-phenolic resin binder system useful in a container coating composition for the food industry. More specifically, the present invention provides an epoxy-phenolic container coating composition comprising a blend of:
(1) a water-miscible amine solubilized epoxy resin, and
(2) a water-soluble monomeric phenolic compound.

DETAILED DESCRIPTION OF THE INVENTION

The present invention provides an aqueous epoxy-phenolic container coating consisting of a blend of:
(1) a water-miscible amine solubilized epoxy resin, and
(2) a water-soluble monomeric phenolic compound.

These coatings are especially useful when cured as container coating compositions for the food industry.

Very suitable epoxy resins include the glycidyl polyethers marketed under the trade designations of EPON$^R$ Resin 1001, 1004, 1007, etc. Other suitable solid epoxy resins include the condensates or fusion resins prepared as described in U.S. Pat. No. 3,477,990. Under certain conditions, a portion of the epoxy resin can be glycidylized novolak. Other suitable epoxy compounds include those compounds derived from polyhydric phenols and having at least one vicinal epoxy group wherein the carbon-to-carbon bonds within the six-membered ring are saturated. Such epoxy resins may be obtained by at least two well-known techniques, i.e., (1) by the hydrogenation of glycidyl polyethers of polyhydric phenols or (2) by the reaction of hydrogenated polyhydric phenols with epichlorohydrin in the presence of a suitable catalyst such as Lewis acids, i.e., boron trihalides and complexes thereof, and subsequent dehydrochlorination in an alkaline medium. The method of preparation forms no part of the present invention and the resulting saturated epoxy resins derived by either method are suitable in the present compositions.

Epoxy resins that may also be used include the hydrogenated resins prepared by the process described in U.S. Pat. No. 3,336,241. More preferred are the hydrogenated glycidyl ethers of 2,2-bis(4-hydroxyphenyl) propane, sometimes called the diglycidyl ethers of 2,2 bis(4-cyclohexanol) propane.

The most preferred epoxy resin is a glycidyl polyether of 2,2-bis(4-hydroxyphenyl) propane having a molecular weight between about 350 and 1,000. A very suitable glycidyl polyether is designated as polyether A in U.S. Pat. No. 2,633,458. Epoxy resins are discussed in detail in U.S. Pat. Nos. 4,094,844; 4,098,744 and 4,119,609 to Allen et al.

These epoxy compounds are typically rendered water miscible by a two-step method. In the first step, an amino-substituted aromatic carboxylic acid such as paraaminobenzoic or anthranilic acid (ortho-aminobenzoic acid) is reacted with a low molecular weight epoxy resin at temperatures low enough to react the amine groups with the epoxy resin in an organic solvent, preferably an etheralcohol solution (i.e., about 25% by weight of the total reactants) while leaving the carboxyl group essentially unreacted.

Suitable amino-substituted aromatic carboxylic acids include the acids having the following structure:

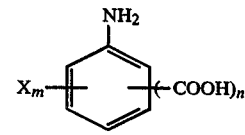

wherein X is selected from the group consisting of hydroxyl, alkyl and halogen radicals, n has a value of 1 or 2 and m has the value of 0 or 1.

Preferred amino-substituted aromatic carboxylic acids include the amino-substituted benzoic acids such as ortho-, meta- and para-aminobenzoic acids.

The most preferred aromatic acid is para-aminobenzoic acid (PABA).

The use of "para-aminobenzoic acid" or "PABA" in the present disclosure relevant to the preparation of the water-miscible epoxy resin is deemed to include the other amino-substituted aromatic acids as such terms are used for convenience only.

In the second step, the carboxyl-containing epoxy aminobenzoic acid adduct is reacted with an amine wherein the carboxy groups are "neutralized" and the adduct water solubilized.

Suitable primary amines include the amines of the general formula:

RNH$_2$ wherein R may be an alkyl radical: methyl, propyl, butyl and the like; or an alkanol radical: methanol, ethanol, propanol and the like. A preferred primary amine is 2-amino-2-methyl-1-propanol.

Suitable secondary amines include the amines of the general formula:

wherein $R_1$ and $R_2$ may be the same or different hydrocarbon radicals; such as alkyl radicals: methyl, propyl, butyl and the like; alkanol radicals: methanol, ethanol, propanol and the like.

Examples of very suitable secondary amines include N-methylethanol amine, diethanolamine, dimethylamine, diethylamine, dipropylamine, and morpholine.

Suitable tertiary amines include the amines of the general formula:

wherein $R_1$, $R_2$ and $R_3$ may be the same or different hydrocarbon radicals, such as alkyl radicals: methyl, propyl, isopropyl, butyl, etc.; alkanol radicals: methanol, ethanol, propanol, isopropanol, and the like.

Examples of very suitable tertiary amines include triethylamine, triisopropylamine, tributylamine, dimethylethanolamine and diethylethanolamine. A preferred tertiary amine is 2-dimethylamino-2-methyl-1-propanol.

Preferred are the tertiary amines and ammonia.

The second step (neutralization) reaction is generally performed at temperatures between about 150° and 210° F., and preferably between about 180° and 190° F.

The neutralized product from step two is thereby rendered water-miscible and can be referred to as an amine-solubilized epoxy resin. This amine-solubilized epoxy resin can then be used in the formation of the container coating composition of the present invention by blending with a phenolic compound.

The selection of a suitable water soluble phenolic compound is a critical aspect of the present invention. The phenolic compound must be water soluble and result in a coating exhibiting excellent flow and leveling characteristics as well as resulting in a coating having excellent resistance to high acid content and high protein content foods. The phenolic compound is preferably monomeric, i.e., free of any polymeric species. A monomeric phenolic compound results in greater water solubility and a high crosslinking density after reaction with the epoxy compound. Moreover, because of its monomeric nature, the phenolic compound acts as a non-volatile reactive solvent, which results in improved solubility of the epoxy compound and improvement in flow and leveling of the coating, especially when applied under the direct roll coater.

The preferred phenolic compounds are substituted phenol and bis-phenol A compounds which can be represented by the following structures:

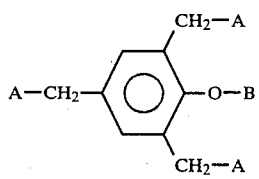

-continued
and

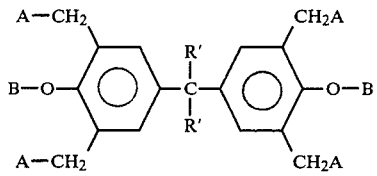

wherein
A represents a substituent selected from OH and $NR_1R_2$; wherein $R_1$ and $R_2$ are lower alkyl or alkanol groups of 1-4 carbon atoms;
B represents a substituent selected from hydrogen and R wherein R is a methyl or ethyl group and
R' can be the same or different and represents hydrogen or $CH_3$.

The phenolic compound augments the solubilization of the epoxy resin. In a preferred example, when A=OH, 70 parts of epoxy resin are combined with an equivalent amount of a tertiary amine and 30 parts of phenol compound. However, when A=—$NR_1R_2$, then no amine is needed. The phenol compound in this case provides the neutralization medium. In both cases, however, clear solutions are obtained which can be let-down with additional water-cosolvent to the appropriate coating viscosity.

Methylol phenol and the methylol phenyl ether compounds are preferred phenolic compounds and are described in detail in U.S. Pat. No. 2,606,929. They are produced as the amine salts of 2,4,6-trimethylol phenol, which is obtained by reacting formaldehyde with phenol in the presence of an amine, e.g., 2-dimethylamine-2-methyl-1-propanol. The methylol phenyl ether compound is prepared in the presence of sodium hydroxide followed by reaction with methyl iodide or dimethyl sulfate. The methylol derivatives so prepared are mixtures of mono-, di- and trimethylol phenols (substituted in the ortho- and para-positions). However, the trimethylol derivative is the predominant component of these compounds. The bis-phenol A derivative is prepared following a procedure similar to the one employed for the phenol derivatives.

The dialkylaminoethyl phenols employed in this disclosure are Mannich-type bases produced by reaction of phenol with formaldehyde and dialkyl, alkylalkanol or dialkanol amines according to U.S. Pat. Nos. 2,033,092 and 2,220,834. The Mannich base derived from the reaction of phenol, formaldehyde and dimethylamine, is available commercially from Rohm and Haas and designated as DMP-30.

Additional phenolic compounds include those obtained by introducing at least two —$CH_2OH$ or —$CH_2NR_1R_2$ groups into the positions ortho and/or para to the hydroxyl group of o-cresol, p-cresol, p-tertiary phenol and resorcinol; $R_1$ and $R_2$ represent dialkyl, alkylalkanol and dialkylalkanol groups of 1-4 carbon atoms.

The amounts of epoxy and phenolic components can be varied in order to obtain optimum fabrication and food resistance properties. Coating compositions preferably contain from about 60 to 85 percent by weight of the epoxy resin and from about 15 to 40 percent by weight of the phenolic compound.

The aqueous coating described in this invention preferably contains an organic cosolvent. This organic cosolvent provides part of the volatile portion of the coating. The cosolvent preferably constitutes 18-25 percent by weight of the volatile part and deionized water being 75-82 percent by weight of the volatiles. The cosolvent aids in the fusion of the film during air drying prior to curing. Moreover, cosolvent promotes flow and leveling during curing. The cosolvents are characterized by being water-miscible, good solvents for the epoxy polymer, less volatile than water so that they remain in the film while the water is being evaporated yet are sufficiently volatile to be removed during the curing cycle. In addition to aiding film fusion and leveling, cosolvents lower the surface tension of the coating, thus helping in the wetting of the metal substrate. Typical cosolvents are the alkyl ethers of ethylene and propylene glycols, e.g., ethoxyethanol, propoxypropanol, 2-butoxyethanol, diethylene glycol mono-methyl, ethyl and butyl ethers.

After application and curing, the compositions of this invention are tested for flexibility, adhesion, steam processing, food stain resistance, and for solvent resistance.

DESCRIPTION OF THE PREFERRED EMBODIMENT

In order to illustrate the invention more fully, a number of specific embodiments are given. The reactants, their proportions and other specific ingredients are presented as being typical and various modifications can be made in view of the foregoing disclosure and discussion without departing from the spirit or scope of the specification or of the claims. Unless otherwise stated, parts and percentages are by weight.

EXAMPLE 1

A solution of the p-aminobenzoic acid modified epoxy resin was prepared as follows: Into a 2,000 milliliter, three-necked reaction flask was added Epon 1001 (Shell Chemical Co.) 232.5 parts, 2-ethoxyethanol 66.8 parts, 2-butoxyethanol 35.6 parts. This was stirred at room temperature until completely in solution. 34.7 parts p-aminobenzoic acid was added. The temperature was brought to 116° C., and held at 116° C. for 6 hours. 25.0 parts 2-dimethylamino-2-methyl-1-propanol (80% aqueous solution) were added. This was followed by the addition of 540.0 parts deionized water preheated to 98° C. A clear viscous solution was obtained having percent N.V.=28.6, pH=8.3–8.5, viscosity Ford Cup #4, 105 seconds, water:cosolvent, 82:18, percent by weight. The epoxy resin solution described in this example was used in the preparation of coatings according to the following examples.

In the following examples the coating composition blend was subjected to the following tests:

1. Flexibility: A coated and cured panel was fabricated to a can end, steam processed at 250° F. for 90 minutes, acid-copper sulfated to facilitate examination of the presence of micro cracks.

2. Process Resistance: Coated fabricated can end was placed in partially water-filled pressure cooker and kept for 90 minutes at 250° F. No blistering, loss of adhesion or blushing is acceptable.

3. Solvent Resistance: A coated and cured panel was mechanically rubbed 200 times with a cloth soaked in MEK. No delamination, dissolution or penetration of solvent is allowed to be acceptable.

4. Food Resistance to dog food and tomato puree: Food packs containing fabricated can ends were held (a) for 90 minutes at 250° F., (b) for (3) weeks at 120° F. No staining or discoloration due to food-coating interaction is allowed.

EXAMPLE 2

A solution for direct roll coating was prepared as follows: 2,4,6-trimethylol phenol 41.16 parts, deionized water 78.6 parts, propoxypropanol 48.6 parts and Byk 301 (silicone in 50% 2-butoxyethanol) 2.52 parts were heated at 40° C. until dissolved. This solution was added with stirring to 338.4 parts of resin solution prepared according to Example 1. A clear solution resulted having a Gardner-Holdt viscosity of 0, and pH=9.0. The solution, furthermore, had percent non-volatiles of 27.2. This solution was direct roll coated on tin-free steel and cured at 400° F. for ten minutes. The cured coating was tough and chemically resistant. It passed the above described tests. Coating weight was 3.5–4.0 milligrams/square inch.

EXAMPLE 3

A solution for direct roll coating was prepared as follows: 2,6,2',6'-tetramethylol bis-phenol A 20.6 parts, propoxyisopropanol 15.5 parts, deionized water 56.9 parts and Byk 301 (silicone in 50% 2-butoxyethanol) 1.26 parts were heated at 45° C. until dissolved. The resulting solution was added with stirring to 169.2 parts of a resin solution prepared according to Example 1. A clear solution resulted having a Gardner-Holdt viscosity of U, a pH=8.9, and percent non-volatiles of 26.0. This solution was direct roll coated on electrolytic tinplate and cured at 400° F. for ten minutes. The cured coating was tough and chemically resistant. It passed all the above-described tests. Coating weight was 3.5–4.0 mg/square inch.

EXAMPLE 4

The following ingredients were heated at 50° C. until dissolved: methyl ether of 2,4,6 trimethyl phenol 30.8 parts, 2-butoxyethanol 13.8 parts and deionized water 57.0 parts. Solution was added with stirring to 241.6 parts of resin solution prepared per Example 1. A clear solution resulted having Gardner-Holdt viscosity of G-H, pH=8.2 and had percent non-volatiles of 30.0. This solution was direct roll coated on electrolytic tinplate and cured at 400° F. for ten minutes. The cured coating was tough, chemically resistant and passed the tests set out above. The coating weight was 3.5–4.0 milligrams/square inch.

EXAMPLE 5

A solution of the p-aminobenzoic acid modified epoxy resin was prepared as follows: Into a 1,000 milliliter, three-necked reaction flask, Epon 829 (Shell Chemical Co.,) 222.0 parts, bisphenol A 77.0 parts were added and heated rapidly to 177° C. The temperature was held at 177° C. for fifty minutes. The hot solution was quenched with 86.0 parts 2-butoxyethanol. 44.7 parts p-aminobenzoic acid was then added. The temperature was brought to 116° C. and held at 116° C. for 6 hours. 61.4 parts 2-butoxyethanol were added. A clear viscous solution of modified epoxy resin was obtained having 70% non-volatiles.

EXAMPLE 6

A solution for direct roll coating was prepared as follows: 2-butoxyethanol 39.2 parts, 2,4,6-tris (dimethylaminoethyl) phenol (DMP-30 Rohm and Haas) 61.6 parts, and the resin solution of Example 5, 200 parts, were heated at 55°–60° C. for one hour until dissolved. The above solution was added to 433.4 parts deionized water at room temperature. A clear solution resulted having a Gardner-Holdt viscosity of V, a pH=10.2 and percent non-volatiles of 28.0. This solution was direct roll coated on electrolytic tinplate and cured at 400° F. for ten minutes. The cured coating passed the above described tests. The coating weight was 3.5–4.0 milligrams/square inch.

EXAMPLE 7

A solution of 15.5 parts phenol and 37.7 parts N-methylethanolamine was chilled with cold water and treated dropwise with 46.8 parts aqueous formaldehyde (37%) at 20°–25° C. over 40 minutes. The clear solution was kept overnight at ambient temperature, refluxed for 30 minutes, and vacuum stripped at 40°–65° until practically all the water and excess formaldehyde were removed. The viscous yellow product was diluted with enough butyl cellosolve to make a clear, mobile solution of 85% total non-volatiles.

EXAMPLE 8

A solution for direct roll coating was prepared as follows: Heat the following ingredients at 55°–60° C. for one hour until dissolved: 2-butoxyethanol 39.2 parts, 61.6 parts of compound prepared by Example 7, and 200 parts of the resin solution of Example 5. The above solution was added to 375.0 parts deionized water at room temperature under high speed mixing using a Cowles dissolver. A clear solution resulted having a Gardner-Holdt viscosity of W-X, a pH=9.5 and percent non-volatiles of 30.4. This solution was direct roll coated on tin-free steel and cured at 400° F. for ten minutes. The cured coating passed the above described tests. The coating weight was 3.5–4.0 milligrams/square inch.

We claim:

1. An aqueous container coating composition consisting of a blend of
   (a) from about 60 to 85% by weight of a water-miscible amine solubilized epoxy resin, and
   (b) from about 15 to 40% by weight of a water soluble monomeric phenolic compound.

2. The coating composition of claim 1 wherein the epoxy is a glycidyl polyether resin.

3. The coating composition of claim 1 wherein the monomeric phenolic compound is a substituted phenol or bis-phenol A.

4. The coating composition of claim 1 wherein the phenolic compound is selected from a compound represented by the following structures:

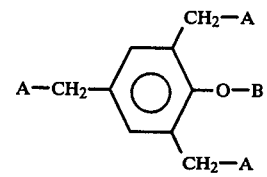

and

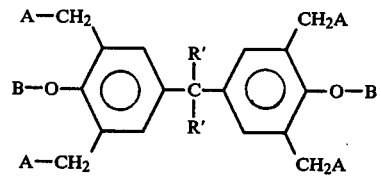

wherein
A represents a substituent selected from OH and $NR_1R_2$; wherein $R_1$ and $R_2$ are lower alkyl or alkanol groups of 1–4 carbon atoms;
B represents a substituent selected from hydrogen and R, wherein R is a methyl or ethyl group, and
R' represents hydrogen or $CH_3$.

5. The coating composition of claim 1 wherein the coating contains 18–25% organic cosolvent in 75–82% water.

6. The coating composition according to claim 5 wherein the organic cosolvent is selected from alkyl ethers of ethylene and propylene glycol; methyl, ethyl and butyl ethers.

* * * * *